United States Patent [19]

Woods

[11] 3,924,585
[45] Dec. 9, 1975

[54] ELECTROMAGNETIC FAN CLUTCH FOR A WATER-COOLED VEHICLE ENGINE

[75] Inventor: Robert L. Woods, Mesquite, Tex.
[73] Assignee: Eagle-Motive Industries, Inc., Fort Worth, Tex.
[22] Filed: Jan. 23, 1975
[21] Appl. No.: 543,469

[52] U.S. Cl............ 123/41.12; 192/82 T; 192/84 C
[51] Int. Cl.² ..................... F16D 27/10; F16D 43/25
[58] Field of Search....... 192/84 C, 82 T; 123/41.12

[56] References Cited
UNITED STATES PATENTS

| | | | |
|---|---|---|---|
| 3,044,594 | 7/1962 | Bernard | 192/84 C |
| 3,184,024 | 5/1965 | Aschauer | 192/82 T |
| 3,262,528 | 7/1966 | Weir | 192/82 T |
| 3,455,421 | 7/1969 | Miller | 192/84 C |
| 3,530,416 | 9/1970 | Klinkenberg | 192/84 C X |

Primary Examiner—Allan D. Herrmann
Attorney, Agent, or Firm—Wm. T. Wofford

[57] ABSTRACT

Disclosed herein is an electromagnetic clutch which disengages the radiator cooling fan of a motor vehicle engine when the engine temperature is sufficiently low. The clutch, adapted to be placed as an accessory on various engines, mounts on a shaft with an adapter on one end to bolt to existing fan mountings. A toroidal shaped field coil is mounted on the shaft by conventional roller or ball bearings and restrained such that it does not rotate. A housing mounted forwardly and separately of the coil on the shaft is supported by a second set of bearings. The housing has a cavity into which the coil is inserted, and a shoulder for bolting a fan to it. An annular armature is supported on the other side of the housing by leaf springs attached to a hub, the hub being rigidly fastened to the end of the shaft. The armature may be flexed in a plane parallel to the axis of the shaft and is urged away from the housing by these springs. Energizing the coil provides a magnetic force which draws the rotating armature into a friction contact with the housing, rotating the fan.

4 Claims, 3 Drawing Figures

ELECTROMAGNETIC FAN CLUTCH FOR A WATER-COOLED VEHICLE ENGINE

BACKGROUND OF THE INVENTION

1. Field of the Invention

This invention relates in general to motor vehicle engines and in particular to an electromagnetic clutch for a radiator cooling fan for vehicle engines.

2. Description of the Prior Art

In a conventional engine and fan, the radiator fan turns constantly with the engine, being rotated by pulleys and belts from the crankshaft along with the water pump and generator. The fan moves air through the radiator in order to cool the cooling fluid. This air movement is particularly necessary when the vehicle is at low speeds or stationary.

When the vehicle is at higher speeds, however, the incoming or ram air is often sufficient for cooling without the need for a fan. The advantages of eliminating the fan at high speeds are pronounced for large truck engines. These engines, requiring large cooling fluid capacities, necessarily have large radiators and fans. The large diameter fans are noisy and require as much as 20 horsepower to rotate them. Thus a fan that would be rotated by the engine only if the engine became hot enough to need the additional air movement would be advantageous.

One way to engage and disengage a fan from engine rotation is to provide a fan clutch which is connected to a temperature sensing element that allows the fan to rotate freely if engine temperature is low, and engages the fan with engine rotation if the temperature is high.

One means to do this would be with an electromagnetic clutch, whose field coil would be energized by a temperature responsive element. The principle of electromagnetic clutches is, of course, known in the art, but the principle is difficult to apply to motor vehicle radiator cooling fans because of the belts and pulleys, and the need for the fan to rotate freely while disengaged.

The general object of this invention is to provide an improved electromagnetic clutch for a radiator cooling fan on motor vehicles.

Another object of this invention is to provide an electromagnetic clutch for a radiator cooling fan on motor vehicles which is inexpensive and easily adaptable as an accessory to existing motor vehicles.

Another object of this invention is to provide safety means which allow the entire clutch to rotate should any bearings freeze.

DESCRIPTION OF THE PREFERRED EMBODIMENT

Figure 1:
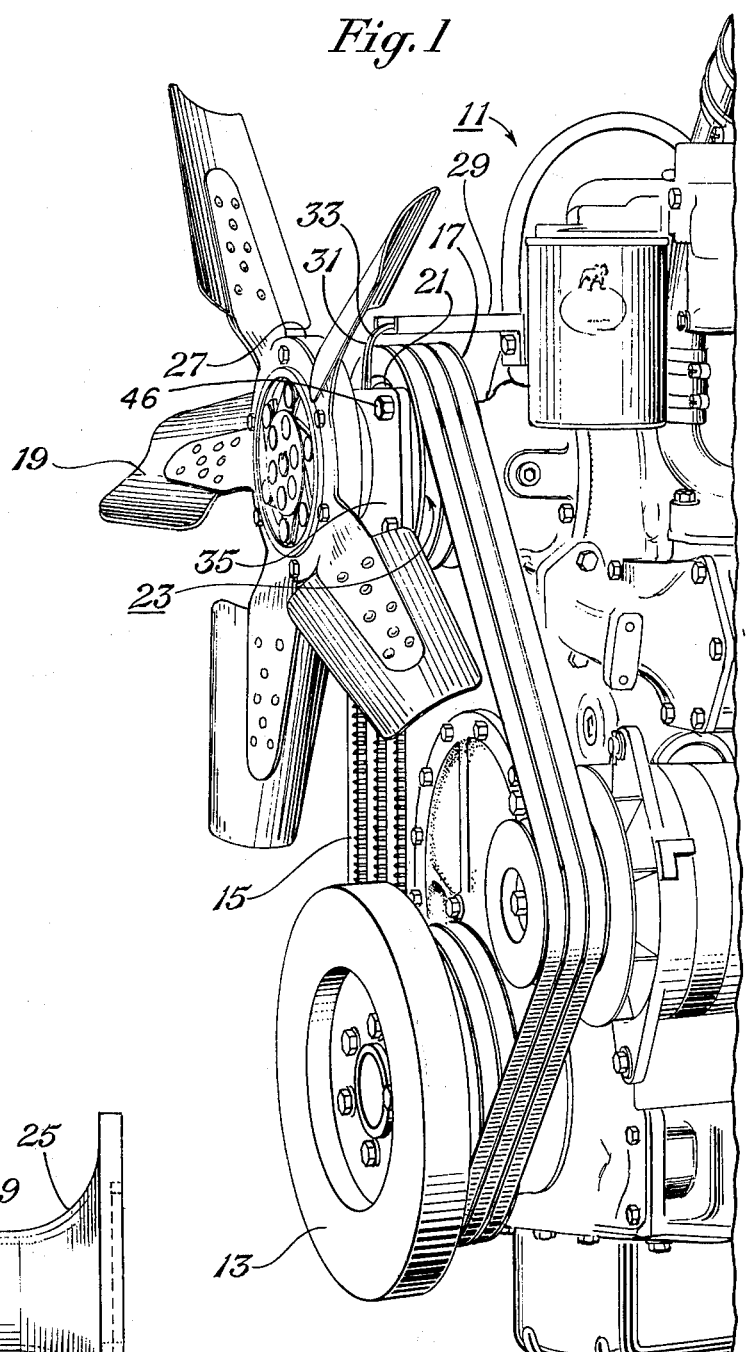
FIG. 1 is a fragmentary perspective view of a typical truck engine, utilizing an electromagnetic clutch constructed in accordance with this invention.

Referring initially to FIG. 1 of the drawings, there is shown a typical truck engine 11. Flywheel 13 rotates continuously with the engine 11, and through belts 15 and pulleys 17, rotates the fan 19 for cooling the radiator (not shown) fluid. In a conventional engine, the fan 19 is bolted directly to fan mounting 21, thus turns continuously with the engine rotation.

In accordance with this invention, the electromagnetic clutch assembly 23 bolts directly to the existing fan mounting 21 by means of an adapter 25. A special fan 19 bolts directly to the housing 27 of the clutch assembly 23. The special fan 19 differs from the conventional fan in that the diameter of the center hole 28 is larger so that it will fit on the housing 27. Bracket 29, which is attached to a suitable place on the engine 11, provides support for the coil energizing wires 31, 33. The wires 31, 33 also provide restraining means, preventing the coil support 35 from rotating. Should bearings in the clutch assembly 23 seize, friction connections 37, 39 will allow wires 31, 33 to part, and the entire clutch assembly 23 will rotate without causing additional damage.

Figure 2:
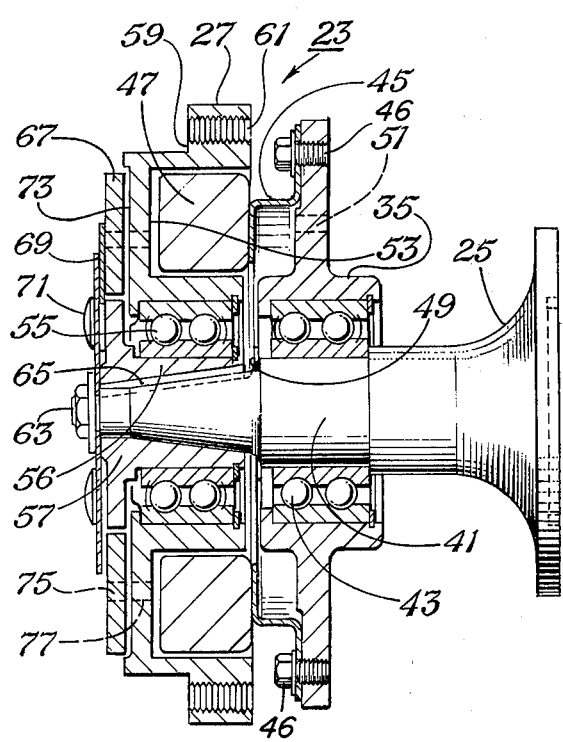
FIG. 2 is a vertical sectional view of the electromagnetic clutch of FIG. 1.
Figure 3:
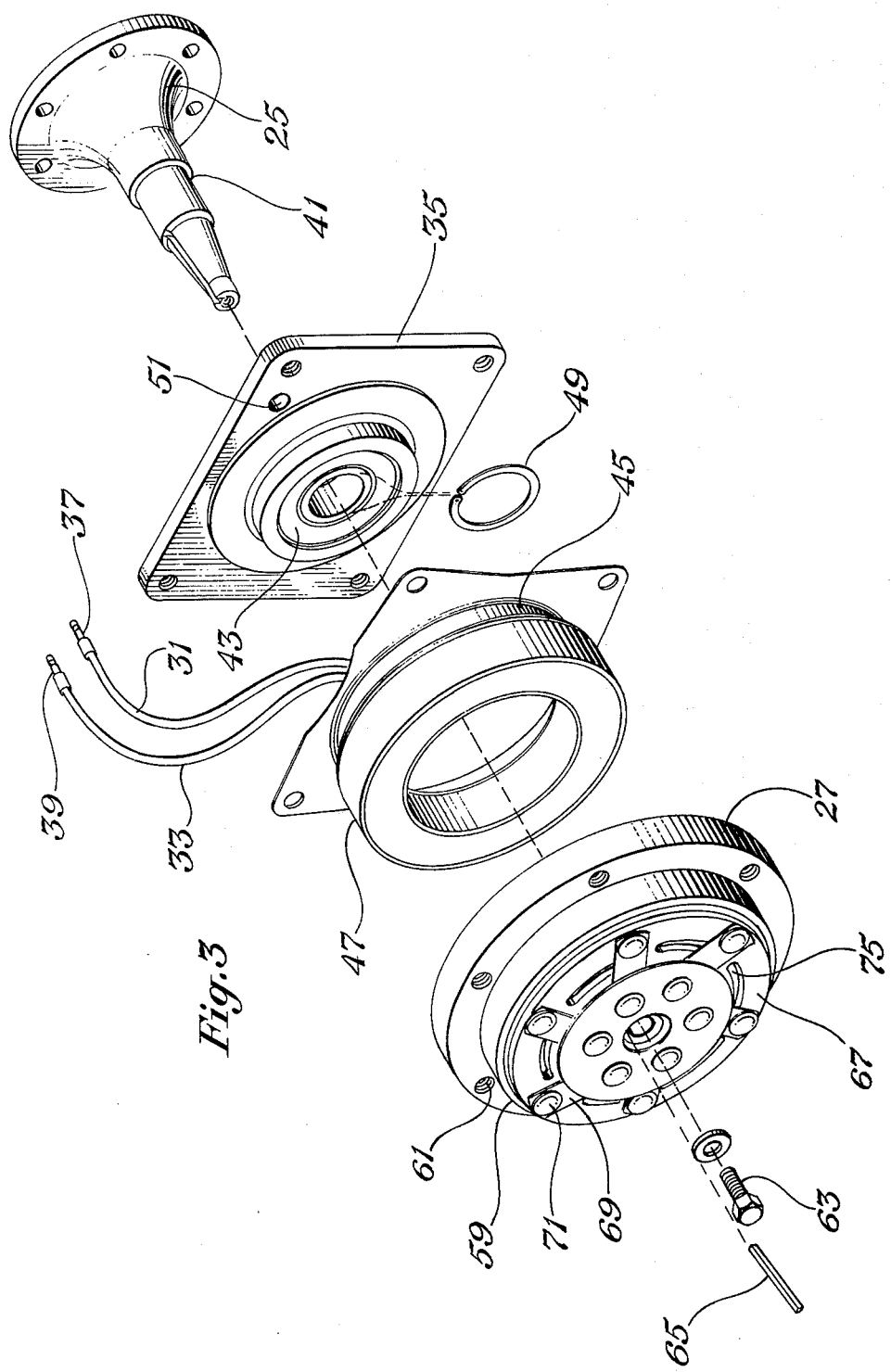
FIG. 3 is an enlarged exploded perspective view of the electromagnetic clutch of FIG. 2.

As shown more clearly in FIG. 2 and 3, the adapter 25 may be of conical shape and contain a shaft 41 upon which the clutch assembly 23 mounts. The shaft 41 and adapter 25 may be of one piece or two pieces, suitably connected such as by welding, by attaching a nut, or by a snap ring and key placed on the end of the shaft 41 (not shown).

The first piece to fit over the shaft 41 is coil holder 35, mounted on bearings 43. The coil holder 35 is a metal plate to which the coil base 45 and coil 47 are attached by bolts 46. The coil 47 is attached to the base 45 by soldering or welding. As FIG. 2 shows more clearly, the coil 47 is held forwardly of the coil holder 35 by the base 45. The coil 47 is a conventional torroidal shaped iron core field coil. A snap ring 49 fits into a groove on shaft 41 retaining coil 47 and coil holder 35 in place. Wires 31, 33 for conducting current to coil 47 insert through hole 51 and prevent the coil 47 from rotating.

Housing 27 contains an annular cavity 53 into which the coil 47 is inserted. The cavity 53 is slightly larger than coil 47 such that at no time do they come into contact with each other. The housing 27 is supported on a second set of bearings 55 which fit upon the hollow shank 56 of hub 57. The housing contains a shoulder 59 which has threaded holes 61 for bolting fan 19 to the housing 27. The housing 27 is of a material such as aluminum that is not attracted by the magnetic force of coil 47 when energized.

Hub 57 is rigidly attached to the shaft 41 by means of bolt 63 and key 65, which lock the shank 56 to shaft 41. At this point, shaft 41 is tapered in order to provide additional strength to hub 57 through the shank 56. Hub 57 does not come into contact at any time with housing 27.

Encircling and attached to the hub 57 is a ring or annular shaped armature 67. The armature 67 is attached by means of flexible flat leaf springs 69 to the hub 57 so that the armature 67 can reciprocate along the axis of the shaft 41. The springs 69 are of a spring steel and are fastened at either end by rivets 71 to the hub 57 and armature 67. The springs 69 act as a bias means to urge the armature 67 forwardly away from the housing 27. The armature 67 is composed of a ferrous metal such that it is attracted by the magnetic field to coil 47 when energized. When not energized, the armature 67 does not come into contact with the housing 27.

In operation, when the engine is sufficiently cool, there is no current flowing to the coil 47 and no magnetic field. Shaft 41 will rotate the hub 57 and armature 67, but the armature 67 is not in contact with the housing 27. The coil 47 and holder 35 remain stationary through restraining means comprising wires 31, 33 and bracket 29. Housing 27 and fan 19 are free to rotate or remain stationary. Since they are supported by bearings, the rotation, if any, will not be that of the engine but of motion transmitted through the bearings and ram air if the vehicle is moving.

Once the water temperature becomes sufficiently hot, energizing means comprising a temperature sensing element, which is a conventional temperature responsive solenoid (not shown), will close a contact sending current to the coil 47. A magnetic field is generated which attracts the rotating armature 67, causing it to come into friction contact with the face 73 of housing 27. The armature 67 acts thus as a clutch plate, causing the housing 27 and attached fan 19 to rotate with the engine. A plurality of annular slots 75, 77 are formed in the armature 67 and housing 27 to aid in dissipating heat generated by the initial friction contact between the two.

It should be apparent from the foregoing description that an invention having significant advantages has been provided. The fan clutch is compact, inexpensive and and easily adaptable to existing motor vehicle engines. Because the fan will be forced to rotate only when needed, horsepower requirements and noise are reduced, especially on large truck engines. Should a malfunction occur causing the bearings to seize, the wires will detach and the entire assembly rotates as a conventional fan.

While this invention has been shown in only one of its forms, it should be apparent to those skilled in the art that it is not so limited but is susceptible to various changes and modifications without departing from the spirit thereof. For example the coil base and support might be formed in a single piece rather than bolted together. Also rather than a taper on the shaft, the portion of the shaft where the hub attaches could be cylindrical but of a reduced diameter. Or the shank of the hub may be eliminated with the bearings of the housing fitting upon the shaft directly. Other types of springs may be visualized. Also, the clutch may be manually energized.

I claim:

1. An electromagnetic clutch for the radiator cooling fan of a motor vehicle engine comprising:
   a shaft having one end adapted to bolt to the fan mounting of said engine,
   a field coil carried concentrically on said shaft by bearings,
   a housing of non-magnetic material carried forwardly of said coil and mounted on said shaft by bearings,
   said housing provided with means for mounting a fan,
   a hub attached rigidly to said shaft adjacent the forward end of said shaft,
   an armature mounted movably to said hub, movable in a plane parallel to said shaft,
   bias means connected between said hub and said armature urging said armature away from said housing,
   energizing means for supplying electrical current to said coil,
   whereby upon energization of said coil a magnetic force draws said armature inwardly to engage frictionally with said housing in order to rotate said fan with said shaft.

2. An electromagnetic clutch for the radiator cooling fan of a motor vehicle engine comprising:
   a shaft having one end adapted to bolt to the fan mounting of said engine,
   a torroidal shaped field coil carried concentrically on said shaft by bearings,
   a housing of non-magnetic material provided with an annular coil receiving cavity and carried concentrically by said shaft independently of said coil on bearings,
   said housing provided with a shoulder for mounting a fan,
   a hub attached rigidly to said shaft adjacent the forward end of said shaft,
   an armature mounted movably to said hub, capable or being reciprocated in a plane parallel to said shaft,
   bias means connected between said hub and said armature urging said armature away from said housing,
   energizing means for supplying electrical current to said coil upon a selected engine temperature,
   whereby upon energization of said coil a magnetic force from said coil draws said armature inwardly to engage frictionally with said housing in order to rotate said fan with said shaft.

3. An electromagnetic clutch for the radiator cooling fan of a motor vehicle engine comprising:
   a shaft having one end adapted to bolt to the fan mounting of said engine and having a frusto conical taper at its other end,
   a torroidal shaped field coil carried concentrically on said shaft by a holder containing bearings,
   restraining means preventing said coil from rotation,
   a housing of non-magnetic material carried concentrically on said shaft by bearings,
   said housing being provided with an annular cavity for receiving said coil,
   said housing being provided with a shoulder for mounting a fan,
   a hub attached rigidly to said shaft adjacent the end of said shaft,
   said hub being provided with a shank the lower surface of which mates with the taper of said shaft and the upper surface of which mates with the bearings of said housing,
   an annular armature mounted to said hub by a plurality of leaf springs,
   said springs being flexible to allow said armature to be reciprocated in a plane parallel to said shaft,
   said springs urging said armature away from said housing,
   temperature responsive means for energizing said coil when engine temperature is above a predetermined temperature,
   whereby a magnetic force from said coil draws said armature inwardly to engage frictionally with said housing in order to rotate said fan with said shaft.

4. The fan clutch as defined by claim 3 wherein said restraining means comprises a bracket mounted to said engine adjacent to said coil which supports said electrical wires,
   a friction connection attached within said electrical wires,
   said connection being releasable, whereby if malfunction causes said coil to rotate with said shaft, further damage is prevented.

* * * * *